United States Patent [19]

Hiraide et al.

[11] Patent Number: 5,660,211
[45] Date of Patent: Aug. 26, 1997

[54] GALVANIC CORROSION RESISTANT INSULATING PIPE HAVING EXCELLENT FILM ADHESION

[75] Inventors: Nobuhiko Hiraide, Hyogo; Masakatsu Ueda, Nara; Toshiro Anraku, Hyogo, all of Japan

[73] Assignee: Sumitomo Metal Industries, Osaka, Japan

[21] Appl. No.: 2,492

[22] Filed: Jan. 6, 1993

[30] Foreign Application Priority Data

| Jan. 6, 1992 | [JP] | Japan | 4-000239 |
| Oct. 26, 1992 | [JP] | Japan | 4-287367 |
| Oct. 26, 1992 | [JP] | Japan | 4-287368 |
| Oct. 26, 1992 | [JP] | Japan | 4-287369 |
| Dec. 25, 1992 | [JP] | Japan | 4-347193 |
| Dec. 25, 1992 | [JP] | Japan | 4-347194 |

[51] Int. Cl.$^6$ ................................ F16L 9/14
[52] U.S. Cl. ................ 138/143; 138/149; 138/DIG. 6; 285/54
[58] Field of Search .................. 138/143, 149, 138/DIG. 6; 285/53, 54; 428/621, 627, 633

[56] References Cited

U.S. PATENT DOCUMENTS

| 4,366,971 | 1/1983 | Lula | 285/55 |
| 4,471,017 | 9/1984 | Poeschel | 428/621 |
| 4,524,996 | 6/1985 | Hunt | 285/55 |
| 4,530,884 | 7/1985 | Erickson | 428/621 |
| 4,853,297 | 8/1989 | Takahashi | 138/DIG. 6 |
| 4,875,713 | 10/1989 | Carstensen . | |
| 4,943,489 | 7/1990 | Kuhara | 138/DIG. 6 |
| 5,164,230 | 11/1992 | Verspui | 428/621 |
| 5,277,942 | 1/1994 | Ikegaya | 428/621 |

FOREIGN PATENT DOCUMENTS

| 0329990A1 | 8/1989 | European Pat. Off. . | |
| 1-199088 | 8/1989 | Japan . | |
| 0278093 | 11/1990 | Japan | 285/54 |
| 8503249 | 8/1985 | WIPO . | |

Primary Examiner—Stephen F. Gerrity
Assistant Examiner—Randall E. Chin
Attorney, Agent, or Firm—Lowe, Price, LeBlanc & Becker

[57] ABSTRACT

A low corrosion resistant pipe 1 is jointed with a high corrosion resistant pipe 2 directly or via a coupling 3. An insulating ceramic film having a thickness of 0.4 μm and a resistivity of $10^8$ Ω cm or more is formed on the outer and inner surfaces of the pipes 1 and 2 at a length L of 60 mm or more from the end of the pipe and on the surface which forms a space when the pipes 1 and 2 are jointed at a coverage ratio of 90% or more to less than 100%.

18 Claims, 4 Drawing Sheets

GALVANIC CORROSION RESISTANT INSULATING PIPE HAVING EXCELLENT FILM ADHESION

BACKGROUND OF THE INVENTION

(a) Field of the Invention

The present invention generally relates to a pipe and in particular to a galvanic corrosion resistant insulating pipe in which galvanic corrosion and crevice corrosion, which otherwise occurs when pipes made of different metals are joined to each other for piping oil country tubular goods, is prevented from occurring and adhesion of an insulating ceramic film on a base material of the pipe is enhanced.

(b) Related Art

Various metal pipes are used in oil wells, including tubing for conveying crude oil and natural gas from the underground production formation up to the ground; casing which is provided around the tubing for protecting bored wells; steam injection pips which increase the pressure in the oil formation; and $CO_2$ pipes for secondarily enhanced oil recovering fossil oil. In oil wells, these metal pipes are disposed in the ground so that they are perpendicular or at an angle substantially perpendicular with respect to the surface of the ground and extend downwardly into the underground at several thousand meters for exploiting or producing crude oil and natural gas. These pipes used herein will hereinafter referred to as oil country pipes.

In general, corrosiveness at a deep level in oil wells is high since the temperature is high. Conversely, corrosiveness in a shallow level in the well is low since the temperature is low. Allowing for economy, high corrosion resistant metal pipes, which are made of stainless steels, Ni based alloys, Ti and Ti based alloys, are often used in the deep level in the well and low corrosion resistant pipes, which are made of carbon steels and, low alloy metals, are often used in the shallow level in the well.

If the low corrosion resistant metal pipe is simply joined to the high corrosion resistant pipe, a potential difference will occur by the contact between different metals, resulting in galvanic corrosion. Corrosion of the low corrosion resistant metal pipe due to galvanic corrosion proceeds at a rate which is 2 to 10 times as higher than the corrosion rate of a single usual carbon steel pipe.

On the other hand, hydrogen is generated on the side of the high corrosion resistant metal pipe. The resultant hydrogen will enter into the pipe to induce hydrogen brittlement. Further, crevice corrosion will occur in the crevices of a joint so that corrosion is promoted by galvanic corrosion.

In order to overcome these problems, the high and low corrosion resistant metal pipes are not directly joined to each other, and a metal pipe made of duplex stainless steel having a corrosion resistance which is intermediate between those of the high and low corrosion resistant metal pipes is interposed between the high and low corrosion-resistant pipes for preventing the corrosion from occurring.

However, it is not possible to completely prevent galvanic corrosion between metal pipes and crevice corrosion from occurring even if an intermediate metal pipe is interposed therebetween. Only the corrosion rate is made slightly lower.

It is practically impossible to completely seal the joined portions when pipes are joined to each other by a blot joining structure. Open ended crevices are inevitably formed. Since there is almost no flow of liquid in the crevices which are formed in the bolt jointed structure, hydrated ions, which are generated by the corrosion of a metal such as iron, have tendency to stay at a high concentration. The pH is remarkably lowered and more severe corrosion than the base material may occur. In other words, crevice corrosion will occur in an environment which is milder than the corrosion environment of the base material. Occurrence of crevice corrosion will lead to stress corrosion cracking.

In order to solve the above mentioned problem, Japanese Unexamined Patent Publication No. Hei 1-199088 discloses that a bolt joined portion of oil country pipes of material with thread coupling containing 7.5% by weight or more of Cr is coated with a non-metallic layer having a thickness of 1 to 100 µm to protect the joined portion from the corrosion environment for preventing crevice corrosion from occurring. However, coating of the non-metallic layer in accordance with the art taught by the above mentioned patent publication provides an advantage as follows:

Non-metallic layers are electrically conductive or insulating material. Even if the non-metallic layer is an electrically conductive material, formation of non-defective film having no pinholes is practically impossible. Since a number of pinholes are usually formed in the film, corrosion of the defective portions of the film can not be prevented from being promoted. Even if the non-metallic layer is the insulating material, crevice corrosion may occur depending upon the coverage ratio of the film. In either case, the art disclosed in the above mentioned patent publication can not sufficiently prevent crevice corrosion.

Although in order to reduce such defective portions of the film, it suffices to reduce the number of pinholes by thickening the film, the increase in film thickness causes lowering of adhesion of the film to a base material and the film may be separated from the base material by shear stress due to the difference between the Young's moduli of the base material and the coating film, which is caused on fastening the joint.

SUMMARY OF THE INVENTION

It is, therefore, an object of the present invention to prevent galvanic corrosion and crevice corrosion which otherwise occurs in pipes made of different metals which are joined to each other in oil wells and the like.

It is another object of the present invention to provide an insulating ceramic layer having an excellent adhesion which coats a metallic pipe thereon.

In order to accomplish the above mentioned objects, the present invention provides a galvanic corrosion resistant metal pipe having an excellent film adhesion with a threaded portion at the end portion thereof, which is formed with a stress relaxation layer including a single or composite layer made of a metal, oxide, nitride or carbide thereof, on at least one of the outer and inner surfaces of the pipe which is exposed when the pipe is joined with another pipe over the length of 60 mm or more from the edge of the pipe on the inner or outer surface thereof excluding the threaded portion; said stress relaxation layer being coated thereon with an insulating ceramic film having a thickness of 0.4 µm or more and a specific resistivity of $10^8$ Ωcm or more at a coverage ratio of 90% or more to less than 100%.

If said pipe is made of a stainless steel or Ni based alloy including 13% by weight or more of Cr and 20% by weight or more of Ni, said stress relaxation layer may include a single or composite layer made of Cr, oxide, nitride or carbide thereof or Ni or oxide thereof.

If said pipe is made of a stainless steel including 13% by weight or more of Cr and 20% by weight or more of Ni, said stress relaxation layer may include a single or composite layer made of Cr, an oxide, nitride or carbide thereof.

If said pipe is made of an Fe based alloy including less than 13% by weight of Cr, said stress relaxation layer may include a single or composite layer made of Fe, oxide, nitride or carbide thereof.

Said stress relaxation layer preferably has a thermal expansion coefficient which is intermediate between those of the insulating ceramic film and the metal pipe.

A diffusion layer which is formed between said stress relaxation layer and the base material of the pipe by the diffusion of ions of the constituent metal of the stress relaxation layer into the pipe base material enchances the film adhesion.

A diffusion layer may be formed between the insulating ceramic film and the stress relaxation layer by the diffusion of ions of the constituent metal of the insulating ceramic film into the stress relaxation layer.

If the insulating ceramic film is coated with a synthetic resin layer on the outer surface thereof for protecting the film, as from an external force, resistance to damage is excellent.

The pipe of the present invention is not limited to the oil country pipes, but is applicable to, for example, joined pipe lines for conveying sea water or disposed fluid or for chemical plants.

BEST MODE OF THE PRESENT INVENTION

Advantages of the present invention will be described in detail with the detailed contents of the present invention.

Galvanic corrosion, which occurs when different metals are ion contact with each other, is caused by the fact that metals which are hard and easy to be corroded function as a cathode and an anode, respectively, and reaction on the side of the anode is promoted. In other words, a voltaic cell is formed by the potential difference between different metals. The present inventors have found that in order to prevent galvanic corrosion, it suffices to block a corrosion current from flowing by forming an insulating ceramic film between different metals so that the distance between the different metals is increased to increase the solution resistance, and have confirmed that this method is effective. Prevention of the galvanic corrosion and crevice corrosion by the above mentioned method will suppress the absorption of hydrogen by the high corrosion resistance pipe. This method is also effective to prevent hydrogen brittlement.

The coverage ratio of the insulating ceramic film will determine whether the galvanic corrosion prevention effect is exhibited or not. The coverage ratio is preferably 90% or more to less than 100%. The coverage ratio is determined by an electrochemical method. That is, the coverage ratio is defined by the following equation, including currents which are monitored by constant potential polarization in a solution in which only the base material is dissolved.

coverage ratio (%)=[(current density of an uncoated base material)−(current density of a coated base material)]/ (current density of an uncoated base material)×100

The galvanic corrosion resistance effect is not sufficient when the coverage ratio of the insulating ceramic layer is less than 90%. The reason why the coverage ratio is less than 100% is that it is difficult to form a film having no pinholes (defects of the film extending to the base material) by current technology.

The insulating ceramic film may be made of $Al_2O_3$, $Si_3N_4$, $Ta_2O_5$, $SiO_2$, AlN, BN and $ZrO_2$ which having a resistivity of $10^8$ Ω cm or more. The material of the film can be determined depending upon the environment in which the film is used.

When the insulating ceramic film has a resistivity of $10^8$ Ω cm or more, the film is completely electrically insulating, when the film has a resistivity which is less than $10^8$ Ωcm, it is semi-conductive. If this semi-conductive film is used, the risk of occurrence of galvanic corrosion between the film and the low corrosion resistant pipe is very high. Therefore, the insulating ceramic film which coats the base material of the pipe has a resistivity of $10^8$ Ωcm or more in accordance with the present invention.

The method of forming an insulating ceramic film on a stress relaxation layer includes ion plating, sputtering plasma CVD, MO (metal-organic)-CVD, thermal CVD spraying, diffusion methods and the like. The lower stress relaxation layer can also be formed by the same methods.

It is preferable to form between the above mentioned insulating ceramic layer and the pipe base material, a stress relaxation preferably having a thermal expansion coefficient which is intermediate between those of the insulating ceramic layer and the pipe base material, the stress relaxation layer including a single or composite layer made of a metal or different metals which are main components of the metal pipe, or oxides, nitrides or carbides thereof. The stress relaxation layer is very effective to improve the adhesion of the insulating ceramic film to the pipe base material or the abrasion resistance of the insulating ceramic layer.

The metals for the stress relaxation layer include Cr, Ti, Ta, Zr, Si Nb, W; the metal oxides include $Cr_2O_3$ and $TiO_2$; the metal nitrides include CrN, TiN, TaN, ZrN, SiN, NbN; the metal carbides include $Cr_7C_3$, $Cr_{23}C_6$, $Cr_3C_2$, TiC, TaC, ZrC, SiC, NbC, WC and the like. $Fe_4N$ or $Fe_2O_3$ may be used for forming the insulating ceramic layer if an Fe based alloy pipe containing less than 13% by weight of Cr is used.

These materials for the stress relaxation layer may be used alone or in combination. The stress relaxation layer may be single layered or multi-layered. The stress relaxation layer which is made of composite materials or is multi-layered is herein referred to as composite layer.

The stress relaxation layer has a thickness of, preferably 0.05 to 5 μm, more preferably 0.1 to 2 μm. If this thickness is less than 0.05 μm, it is difficult to provide a thread portion with a uniform metal layer, resulting in insufficient adhesion. If the thickness exceeds 5 μm, a large stress is generated in the metal layer itself on formation of the film. The adhesion is not enough and abrasion may occur at a high possibility.

It is preferable that the total thickness of the stress relaxation layer and the insulating ceramic film is 100 μm or less. If the thickness exceeds 100 μm, the dimensional precision of the thread portion and seal portion is adversely affected, and the insulating ceramic film may become separated from the stress relaxation layer due to internal stress in the film.

As the base material of the pipe used in the present invention, Fe based alloys including less than 13% by weight of Cr, stainless steel including 13% by weight or more of Cr and 20% by weight or more of Ni, titanium and titanium alloys are preferably used in consideration of corrosion resistance.

It is preferably to laminate a film of a synthetic resin, such as a fluorine resin or polyethylene on the surface of the insulating ceramic film for protecting the film.

If the stress relaxation layer to be formed between the insulating ceramic film and the pipe base material is formed of a metal layer, this metal is determined as the same as the metal of the insulating ceramic film. By forming a diffusion layer in the pipe base material in which ions of the metal of the metallic ceramic film is diffused into the pipe base material, the adhesion and the corrosion resistance of the insulating ceramic film is remarkably enhanced particularly in an oil well environment in which the pipe is under stress.

Referring now to FIG. 11, there is shown a sectional view illustrating an insulating ceramic film 32 and a metallic stress relaxation layer 31 which are applied on a pipe base material 30 in accordance with one embodiment of the present invention. A diffusion layer 33 is disposed at an interface between the insulating ceramic film 32 and the metallic stress relaxation layer 31. The diffusion layer 33 is formed by diffusion of ions of a metal of the insulating ceramic layer 32 into the metallic stress relaxation layer 31.

The diffusion layer has a thickness of substantially several atoms. Accordingly, it is difficult to identify the diffusion layer by an optical microscope.

A diffusion layer 34 is also disposed between the metallic stress relaxation layer 31 and the pipe base material 30. The diffusion layer 34 is formed by diffusion of metal ions of the metallic stress relaxation layer 31 into the pipe base material 30. If this diffusion layer 34 has a thickness of 0.1 μm or more, adhesion is sufficiently enhanced.

The metallic stress relaxation layer is made of metal atoms which constitute the insulating ceramic film. As a result of this, Al, Si, Ta, B or Zr is selected as the material of this stress relaxation film.

After the metallic stress relaxation layer and the insulating ceramic film have been formed, they are heated and maintained at a temperature which is equal to or less than the melting point of the constituent metal of the stress relaxation layer in vacuum or in atmospheric air. This causes the diffusion of the constituent metal atoms between the base material and the metallic stress relaxation layer and the insulating ceramic film, resulting in an insulating film having excellent adhesion. The diffusion treatment temperature may be the melting point of the metallic stress relaxation layer or less. The temperature is preferably 550° C. or less in view of thermal deformation of the thread or strength deterioration of the pipe base material. It is preferable that the temperature be 300° C. and higher in view of economy so far as sufficient diffusion of metallic ions arises.

Processes for forming a non-metallic layer are exemplarily disclosed in the above identified Japanese Unexamined Patent Publication No. Hei 1-199088. It is hard to provide thermodynamically stable crystals at an electric energy for plasma output or sputtering by ion plating, sputtering or plasma CVD of the disclosed processes. Accordingly, only an amorphous film which is formed at a low energy is formed. On the other hand, if thermal CVD or spraying is performed, a crystalline film is formed sine the coating energy is higher.

Therefore, the above identified unexamined patent publication teaches processes for forming only any one of an amorphous film and crystalline film.

If the non-metallic coating film is an amorphous film, it has a thermal expansion coefficient which is approximate to those of metals in comparison with a crystallized film of the same material and the anisotropy is less. Accordingly, the amorphous film exhibits an excellent adhesion to a base metal. However, since the amorphous film is in a metastable state, metal ions in the film are soluted to reduce the thickness of the film. The insulation resistance is thus deteriorated resulting in that sufficient corrosion resistance can not be obtained.

On the other hand, although the crystalline film exhibits an excellent corrosion resistance, it is hard to provide excellent adhesion by the influence of the difference between the thermal expansion coefficient of the crystalline film and that of the base metal and of the anisotropy of the coating film.

If a crystalline film is formed by the thermal CVD process, the corrosion resistance of the film per se is excellent. Since treatment at a temperature of 1000° C. or more is necessary for coating the film, deterioration of strength which is required for the oil country pipes and deformation of thread at joints of the oil country pipes including a premium joint take place.

Since a multiplicity of pores exist in a crystalline coating film which is formed by spraying, corrosive liquid will reach the surface of a pipe via the coating film. A corrosion preventing effect is not obtained.

In a preferably mode of the present invention, excellent corrosion resistance is obtained in a corrosion environment by crystallizing only the surface of the insulating ceramic layer and excellent adhesion to a pipe can be obtained by retaining the underlayer in the amorphous form.

In accordance with the present invention, insulating ceramics such as above mentioned $Al_2O_3$, $Si_3N_4$, $Ta_2O_5$, $SiO_2$, $ZrO_2$ are applied upon the surface of a pipe base material by sputtering, ion plating, plasma CVD or MO (metal organic)-CVD process as mentioned above to form an amorphous layer. Thereafter the surface area of the amorphous layer can be crystallized.

The method of crystallizing the surface area of the amorphous layer includes a plasma method for generating a plasma in an oxidizing gas such as oxygen, carbon dioxide or the mixture thereof for treating the surface of the amorphous layer with the plasma as well as heating method.

When the stress relaxation layer is selectively combined with the insulating ceramic film, it is preferably that the stress relaxation layer and insulating ceramic film are not made of the same material and that the stress relaxation layer has a thermal expansion coefficient which is larger than that of the insulating ceramic film.

DESCRIPTION OF THE EMBODIMENTS

Embodiments in which the present invention is mainly applied to an oil country pipe will be described in detail.

Figure 1:
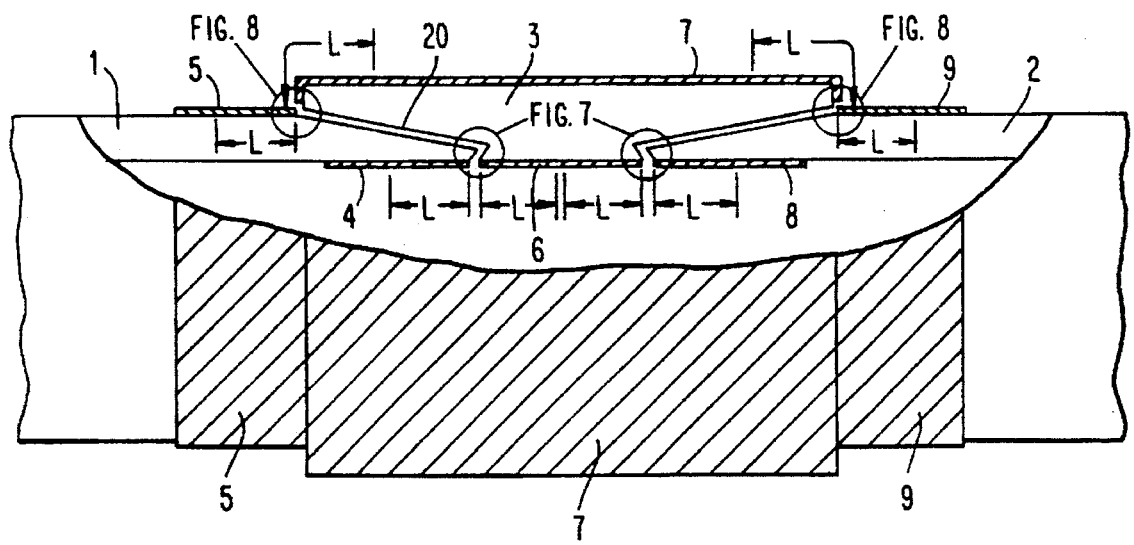
FIG. 1 is a partially cut away sectional and elevational view showing a first embodiment of the present invention in which a joint portion between oil country pipes which are prevented from being galvanically corroded.
Figure 2:
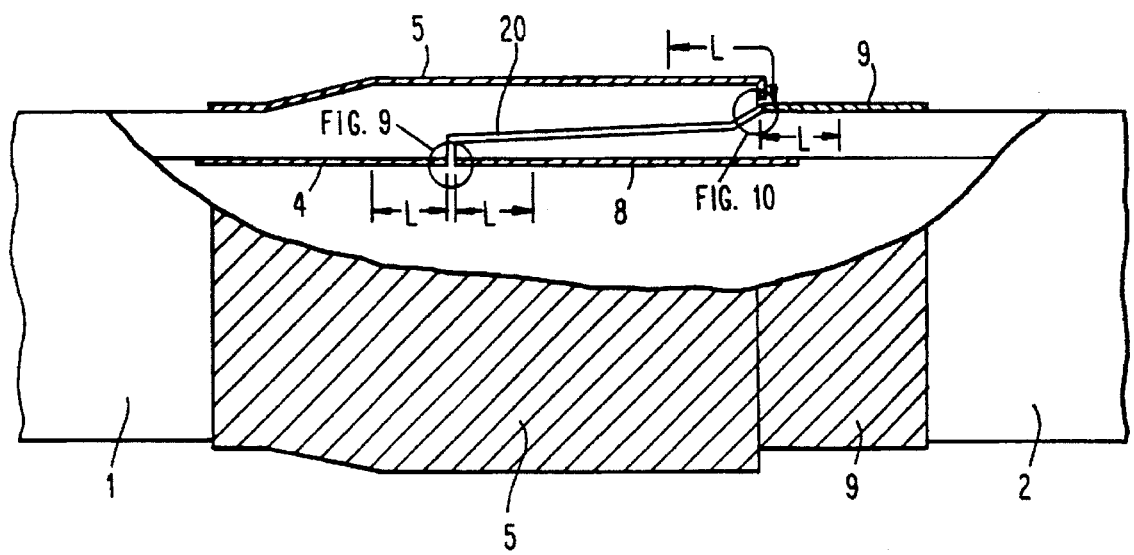
FIG. 2 is a partially cut away sectional and elevational view showing a second embodiment of the present invention of a joint portion between oil country pipes which are prevented from being galvanically corroded.

A joint portion of oil country pipes on which an insulating film of the present invention, specifically an insulating ceramic film is applied are shown in FIGS. 1 and 2. FIG. 1 shows oil country pipes which are joined by a coupling. FIG. 2 shows oil country pipes which are directly joined.

Figure 7:
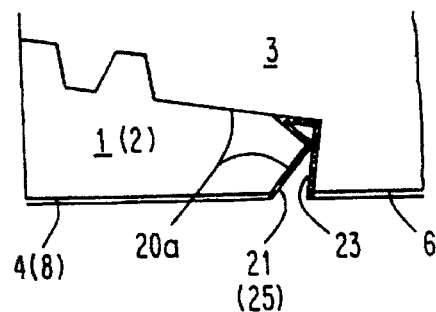
FIG. 7 is a schematic enlarged sectional view showing a part A in FIG. 1.
Figure 8:
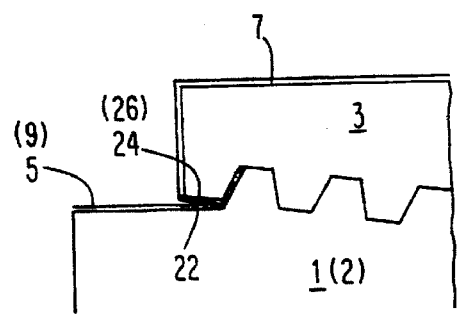
FIG. 8 is a schematic enlarged sectional view showing a part in FIG. 1.
Figure 9:
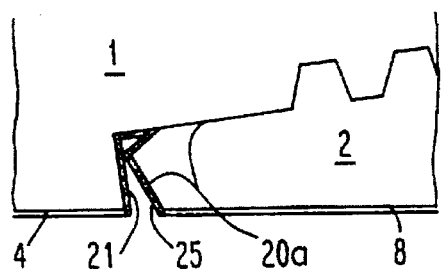
FIG. 9 is a schematic enlarged sectional view showing a part A in FIG. 2.
Figure 10:
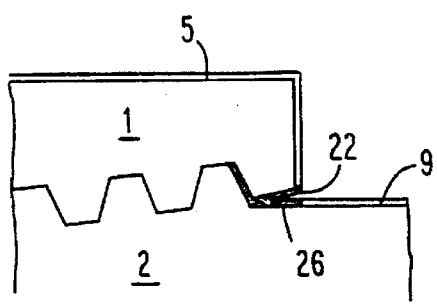
FIG. 10 is a schematic enlarged sectional view showing a part B in FIG. 2.
Figure 11:
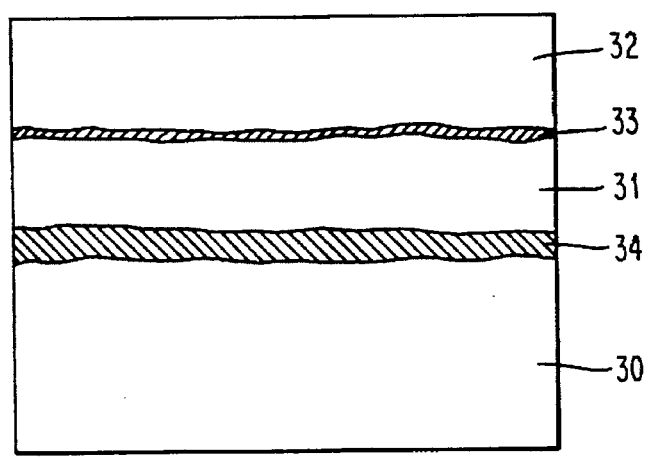
FIG. 11 is a sectional view showing a film of the present invention.

In FIG. 1, a low corrosion resistant pipe 1 is threadably joined with a high corrosion resistant pipe 2 by a coupling 3. The coupling 3 is usually made of a material which is the same as or substantially same as the high corrosion resistant pipe 2. In the present embodiment, multi-layered film of the present invention (this multi-layered film is referred to as adherent insulating film) formed at 4 and 5 on the outer and inner surfaces of the low corrosion resistant pipe 1 over the length of 60 mm or more (represented by L) from the end of the pipe except for the threaded portion thereof. The adherent insulating film is formed at 21 and 22 in the interfaces A and B between the coupling 3 and the pipes 1 and 2. Enlarged interfaces A and B are shown in FIGS. 7 and 8, respectively. As shown in FIG. 11, the adherent insulating film comprises an upper layer 32 made of an insulating ceramic, a lower layer 31 containing a constituent metal of the upper layer 33 and 34 situated, and metal ion diffused layers between the upper and lower layers and between the lower layer and pipe base metal, respectively. The adherent insulating film is formed at 6 and 7 over the entire outer and inner surfaces of the coupling 3 excepting threaded portion 20. The adherent insulating film is formed at 23 and 24 at the interfaces between the pipe 1 and coupling 3 at the end of the threaded portion.

The adherent insulating film of the present invention is formed at 8 and 9 on the outer and inner surfaces of the high corrosion resistant pipe 2 over an length of 60 mm or more from the end thereof, respectively except for threaded portion, and is formed at 21 and 22 at the interfaces between the coupling 3 and the pipe 2.

In the above mentioned embodiment, all the low and high corrosion resistant pipes 1 and 2 and the coupling 5 are formed with adherent insulating film at 4 to 9 and 21 to 26. In view of galvanic corrosion prevention, any one or two of the low and high corrosion resistant pipes 1 and 2 and the coupling 3 may be formed with the adherent insulating film. The coupling 3 is preferably formed with the adherent insulating film at 6 and 7. Briefly, the positions where the adherent insulating film is applied and combination thereof may be properly determined depending upon the use and the degree of the anticipated corrosion.

Referring now to FIG. 2, the low corrosion resistant pipe 1 is directly threadably jointed with the high corrosion resistant pipe 2 without using any coupling. Also in the embodiment of FIG. 2, the adherent insulating film of the present invention is formed at 4 and 5 on the outer and inner surfaces of the pipe 1 over the length of 60 mm or more from the end of the pipe excepting the threaded portion and is formed at 21 and 22 at interfaces A and B between the pipes at the end of the threaded portion. Similarly to the pipe 1, the adherent corrosion resistant pipe 2 is formed at 8 and 9 on the inner and outer surfaces of the pipe 2 over the length of 60 mm or more excepting the threaded portion 20 and is formed at 25 and 26 in the interfaces A and B.

Although both the low and high corrosion resistant pipes 1 and 2 are formed with the adherent insulating film at 4, 5, 8, 9, 21, 22 and 25, similarly to the embodiment of FIG. 1, the adherent insulating film may be formed only at 8 and 9 on only the high corrosion resistant pipe 2 in view of galvanic corrosion prevention. If the adherent insulting film having the stress relaxation film which is a conductive film is formed at 4 in the embodiments of FIGS. 1 and 2, there is the risk that the galvanic corrosion occurs between the conductive film and the low corrosion resistant pipe 1. In this case, it suffices to provide the upper insulating film which is laterally longer than the stress relaxation layer.

Although the pipes 1 and 2 are coated with the adherent insulating film on both inner and outer surfaces thereof in the above mentioned two embodiments, the film need not necessarily be applied on both the inner and outer surfaces thereof. It suffices to apply the adherent insulating film on at least only the surface which is exposed to corrosive environment in oil well. Specifically, a tubing may be coated on both the inner and outer surfaces thereof. The casing may be coated on only the inner surface thereof.

If there is the risk that the pipes 1 and 2 are damaged on the surface thereof by the lift conveying using a wire rope, it is preferably to apply an organic film of a fluorine resin or polypropylene on the surface of the insulating ceramic film to prevent the abrasion or damage thereof from occurring.

Although the length L in which the adherent insulating film extends from the end of a linkage element is prescribed as 60 mm or more, the film may extend on one linkage element over the length of 30 mm or more and extend on the other linkage element so that the total length L is 60 mm or more if the film is formed over the linkage interface. It is to be understood that the present invention includes this embodiment.

However, it is necessary to form the adherent insulating film at least on areas 21 to 26 which forms grooves in FIGS. 7 to 10, which are exposed to the corrosive environment in view of the fact that both the galvanic corrosion and the crevice corrosion occur in positions where crevices are formed when pipes are jointed. It is of course preferable to form the adherent insulating film over the linkage interface as continuously as possible when the adherent insulating film is formed at 4 to 9. Accordingly, if there is steps between the metal pipes 1, 2 and the coupling 3, it is often practically essential to form the adherent insulating film also on the wall of the steps.

Grounds of numerical restriction and advantages of the present invention will become more clear from the following experimental examples.

EXPERIMENTAL EXAMPLE

Figure 3:
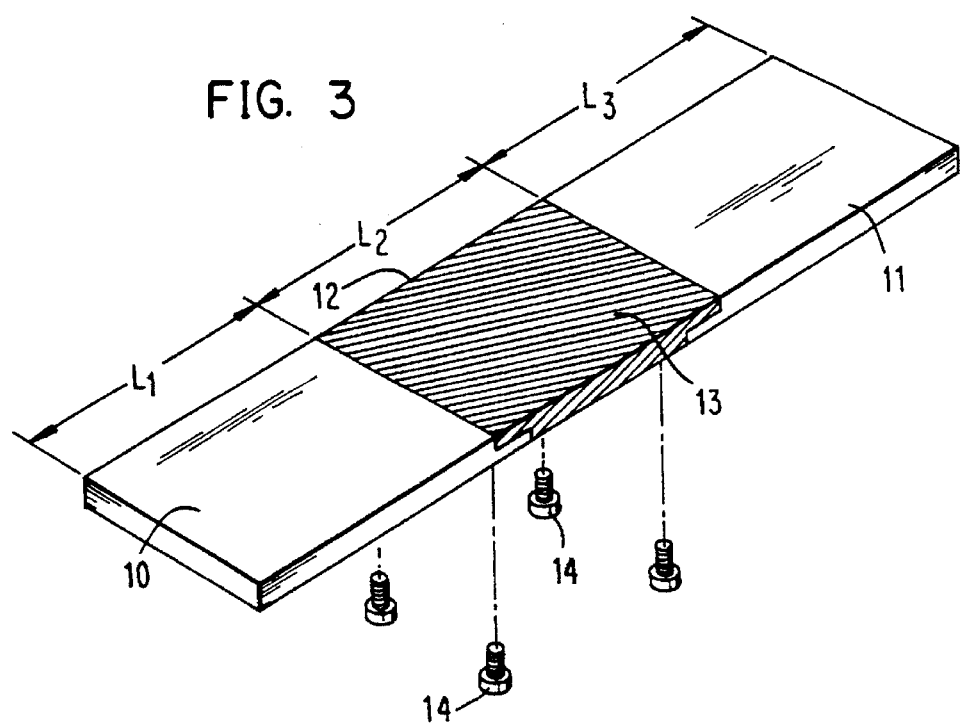
FIG. 3 is a perspective view showing a sample to be tested for corrosion resistance test in the first embodiment.

For galvanic corrosion test, a coupling member 12 which is coated with an adherent insulating film 13 thereon was connected between low and high corrosion resistant member 10 and 11 having uncoated upper surfaces as shown in FIG. 3 to simulate the joint structure of FIG. 1. A test sample including the members 10, 13, 11 which were fastened by bolts 14 was provided and the galvanic corrosion of the sample was observed. L1 and L3 were 100 mm and the members 10 and 11 were coated with a fluorine resin on the sides and the lower surfaces thereof.

Figure 4:
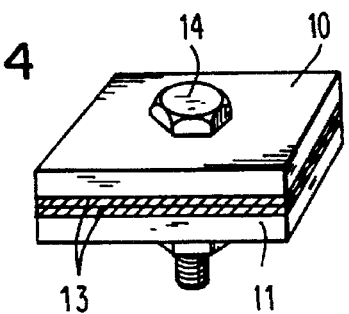
FIG. 4 is a perspective view showing a sample to be tested for crevice corrosion resistance test in the first embodiment.

For the crevice corrosion test, square (30 mm×30 mm) plate-like low and high corrosion resistant members 10 and 11 having a thickness of 3 mm which were coated with an adherent insulating film 13 on the sides thereof were fabricated and both of them were jointed so that the adherent insulating films 13 faced to each other and were fastened by a bolts 14 to provide a sample as shown in FIG. 4.

Figure 5:
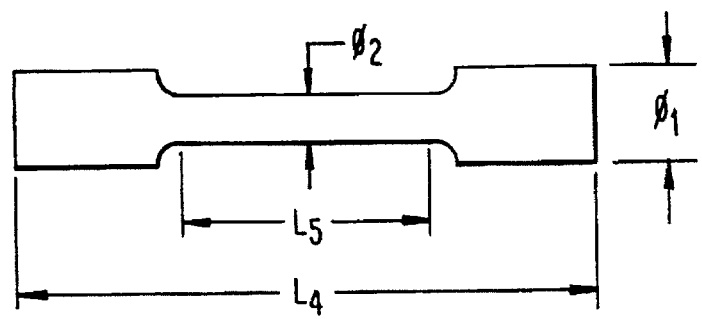
FIG. 5 is a front view showing a sample to be tested for abrasion resistance test in the first embodiment.

For an abrasion resistance test, a tension test sample having a shape shown in FIG. 5 was made of the same material as the coupling member 12. The test sample was 120 mm in full length L4; 50 mm in length L5 of an intermediate reduced portion; 20 mm in thickness $\phi_1$ of the thickened ends; 10±0.05 mm in thickness $\phi_2$ of the intermediate thinned portion. The sample was coated with the adherent insulating film over the entire thereof. The sample which was added with 0.3% tensile strain was provided for the corrosion test to observe whether the adherent insulating film was separated or not.

The low corrosion resistant member 10 used for the above mentioned tests was made of API-L80 grade intermediate carbon steel. The high corrosion resistant member 11 was made of UNSNO.N 08825 (22 Cr - 42 Ni - 3 Mo). The coupling member was made of API-L80 grade intermediate carbon steel and UNSNO.N 08825 and was coated with an adherent insulating film of the present invention.

The stress relaxation layer under the adherent insulating film was made of a metal such as Cr, Ti, Ta, Zr, Si, Nb, W; a metal oxide such as $Cr_2O_3$, $TiO_2$, a metal nitride such as CrN, TiN, TaN, ZrN, SiN, NbN; a metal carbide such as $Cr_7C_3$, $Cr_{23}C_6$, $Cr_3C_2$, TiC, TaC, ZrC, SiC, NbC, WC. The insulating ceramic film was made of $Al_2O_3$, $Si_3N_4$, $Ta_2O_5$, $SiO_2$, AlN or BN. Similar test was conducted for a sample having an insulating ceramic layer which was coated with a fluorine resin thereon for protecting the film. For comparison, a sample having an ceramic film which was made of semi-conductive $TiO_2$ having a resistivity of $10^7$ $\Omega cm$ was used.

The results of combination of a metal, metal oxide, metal nitride and metal carbide forming the stress relaxation layer with the insulating ceramic film thereon are shown in Table 1 and the thermal expansion coefficients of the materials are shown in Table 2.

TABLE 1

|  |  | Cr | Ti | Ta | Zr | Si | Nb | W | Al | B |
|---|---|---|---|---|---|---|---|---|---|---|
| OXIDES | STRESS RELAXATION LAYER (LOWER) | ◯ | ◯ | — | — | — | — | — | — | — |
|  | INSULATING FILM (UPPER) | — | — | ◯ | — | ◯ | — | — | ◯ | — |
| NITRIDES | STRESS RELAXATION LAYER (LOWER) | ◯ | ◯ | ◯ | ◯ | — | ◯ | — | — | — |
|  | INSULATING FILM (UPPER) | — | — | — | — | ◯ | — | — | ◯ | ◯ |
| CARBIDES | STRESS RELAXATION LAYER (LOWER) | ◯ | ◯ | ◯ | ◯ | ◯ | ◯ | ◯ | — | — |
|  | INSULATING FILM (UPPER) | — | — | — | — | — | — | — | — | — |
| METALS | STRESS RELAXATION LAYER (LOWER) | ◯ | ◯ | ◯ | ◯ | ◯ | ◯ | ◯ | — | — |

TABLE 2

UNIT: × $10^{-6}$/°C.

|  |  | Cr | Ti | Ta | Zr | Si | Nb | W | Al | B |
|---|---|---|---|---|---|---|---|---|---|---|
| STRESS RELAXATION LAYER | METALS | 6.5 | 8.9 | 6.5 | 5.0 | 9.6 | 7.2 | 4.5 | — | — |
|  | OXIDES | 7.5 | 9.4 | — | — | — | — | — | — | — |
|  | NITRIDES | 2.3 | 9.3 | 5.0 | 7.9 | — | 10.1 | — | — | — |
|  | CARBIDES | 9.8 | 7.6 | 6.6 | 6.9 | 4.4 | 6.8 | 6.2 | — | — |
| INSULATING FILM | OXIDES | — | — | 0.8 | — | 3.0 | — | 8.0 | — | — |
|  | NITRIDES | — | — | — | — | 3.2 | — | — | 5.7 | 4.8 |

Remark 1) Sources:
① "Metal Data Book" edited by Japan Metal Academy, published by Maruzen (1974).
② "Ceramic Coating" by Hiromitsu Takeda, published by Nikkan Kogyo Shinbun (1988).
③ W. J. Lackey, D. P. Stinton, G. A. Gerny, A. C. Schaffhauser, and L. L. Fehrenbacher; Advanced. Ceramic Materials, 2 (1987). 24

For the galvanic corrosion or the crevice corrosion test, samples were left in an corrosion environment including one atmospheric pressure $CO_2$ and hydrogen sulfide and partially in 5 Nacl solution, at 60° C. for 720 hr. The length L2 of the coupling member 12 which was coated with the adherent insulating film 13 was changed to 50 mm or 60 mm. The coverage ratio was measured. Necessary thickness, length and coverage ratio of the film 2 was determined from the corrosion rate and the presence of the crevice corrosion.

For test of errosion and corrosion resistance of the adherent insulating film 13, after the corrosion test, a sample was continuously rubbed with a semisphere having a radius of 5 mm in boiling 5% Nacl solution at a force of 10 kg/mm at a rate of 5 times/minute for 24 hours to determine whether abrasion occurred or not. At this time lamination effect of the fluorine resin was investigated.

Results of the tests are shown in Tables 3 to 5.

TABLE 3

| | LOW | COUPLING MEMBER 12 | | | | | | | HIGH |
|---|---|---|---|---|---|---|---|---|---|
| | CORROSION RESISTANT MEMBER 10 | STRESS RELAXATION LAYER | INSULATING CERAMIC FILM | | | | | | CORROSION RESISTANT MEMBER 11 |
| TEST NOS | CORROSION RATE (g/m² · hr) | MATERIAL; THICKNESS (μm) | MATERIAL; THICKNESS (μm) | COVERAGE RATIO (%) | L2 (mm) | CREVICE CORROSION | ABRASION | EROSION CORROSION | CORROSION RATE (g/m² · hr) |
| 1 | 0.5 | Cr; 0.2 μm | $Si_3N_4$; 0.5 μm | 90 | 60 | NONE | NONE | NO ABRASION | 0.01 |
| 2 | " | Ti; 0.5 μm | $Al_2O_3$; 4 μm | 92 | " | " | " | " | " |
| 3 | " | Ta; 1 [2m | AlN; 2 μm | 95 | " | " | " | " | " |
| 4 | " | Zr; 1.5 μm | BN; 3 μm | 95 | " | " | " | " | " |
| 5 | " | Si; 2 μm | $SiO_2$; 10 μm | 99.99 | " | " | " | " | " |
| 6 | " | Nb; 0.2 μm | $Ta_2O_5$; 0.5 μm | 90 | " | " | " | " | " |
| 7 | " | W; 0.5 μm | $Si_3N_4$; 1 μm | 90 | " | " | " | " | " |
| 8 | " | $Cr_2O_3$; 1 μm | AlN; 2 μm | 92 | " | " | " | " | " |
| 9 | " | $TiO_2$; 2 μm | $Al_2O_3$; 4 μm | 99.999 | " | " | " | " | " |
| 10 | " | $TiO_2$; 0.5 μm | $SiO_2$; 1 μm | 90 | " | " | " | " | " |
| 11 | " | CrN; 0.2 μm | $SiO_2$; 5 μm | 95 | " | " | " | " | " |

TABLE 4

| | LOW | | COUPLING MEMBER 12 | | | | | | HIGH |
|---|---|---|---|---|---|---|---|---|---|
| | CORROSION RESISTANT MEMBER 10 | STRESS RELAXATION LAYER | INSULATING CERAMIC FILM | | | | | | CORROSION RESISTANT MEMBER 11 |
| TEST NOS | CORROSION RATE (g/m² · hr) | MATERIAL; THICKNESS (μm) | MATERIAL; THICKNESS (μm) | COVERAGE RATIO (%) | L2 (mm) | CREVICE CORROSION | ABRASION | EROSION CORROSION | CORROSION RATE (g/m² · hr) |
| 12 | 0.5 | TiN; 0.5 μm | Al₂O₃; 6 μm | 90 | 60 | NONE | NONE | NO ABRASION | 0.01 |
| 13 | " | TaN; 1 μm | BN; 5 μm | 99 | " | " | " | " | " |
| 14 | " | ZrN; 2 μm | Al₂O₃; 5 μm | 99.99 | " | " | " | " | " |
| 15 | " | NbN; 3 μm | Al₂O₃; 4 μm | 99.99 | " | " | " | " | " |
| 16 | 0.5 | Cr₇C₃; 1 μm | Al₂O₃; 7 μm | 92 | 60 | NONE | NONE | NO ABRASION | 0.01 |
| 17 | " | Cr₂₃C₆; 0.5 μm | Al₂O₃; 5 μm | 90 | " | " | " | " | " |
| 18 | " | Cr₃C₂; 0.1 μm | Al₂O₃; 0.5 μm | 90 | " | " | " | " | " |
| 19 | " | TiC; 0.2 μm | AlN; 0.5 μm | 90 | " | " | " | " | " |
| 20 | " | TaC; 0.4 μm | BN; 1 μm | 92 | " | " | " | " | " |
| 21 | " | ZrC; 1 μm | Si₃N₄; 2 μm | 95 | " | " | " | " | " |
| 22 | " | NbC; 2 μm | Ta₂O₅; 5 μm | 99 | " | " | " | " | " |
| 23 | " | SiC; 3 μm | SiO₂; 5 μm | 99.999 | " | " | " | " | " |

TABLE 5

| | LOW | | COUPLING MEMBER 12 | | | | | | HIGH |
|---|---|---|---|---|---|---|---|---|---|
| | CORROSION RESISTANT MEMBER 10 | STRESS RELAXATION LAYER | INSULATING CERAMIC FILM | | | | | | CORROSION RESISTANT MEMBER 11 |
| TEST NOS | CORROSION RATE (g/m² · hr) | MATERIAL; THICKNESS (μm) | MATERIAL; THICKNESS (μm) | COVERAGE RATIO (%) | L2 (mm) | CREVICE CORROSION | ABRASION | EROSION CORROSION | CORROSION RATE (g/m² · hr) |
| 24 | 0.5 | WC; 5 μm | Ta₂O₄; 10 μm | 99.999 | 60 | NONE | NONE | NO ABRASION | 0.01 |
| 25 | " | Cr + Ti; 0.1 μm | Al₂O₃; 3 μm | 90 | " | " | " | " | " |
| 26 | " | TiO₂ + Cr₂O₃; 1 μm | Ta₂O₄; 3 μm | 99 | " | " | " | " | " |
| 27 | " | TaN + ZrN; 2 μm | Si₃N₄; 4 μm | 99.99 | " | " | " | " | " |
| 28 | " | NbC + SiC; 3 μm | SiO₂; 10 μm | 99.999 | " | " | " | " | " |
| 29* | 2.0 | TiO; 0.1 μm | Al₂O₃; 0.3 μm | 90 | " | PRESENT | " | ABRASION PRESENT | " |
| 30* | 1.5 | Ta; 0.2 μm | SiO₂; 0.5 μm | 85 | " | " | " | ABRASION PRESENT | " |
| 31* | 1.0 | Cr₃C₂; 1 μm | Al₂O₃; 3 μm | 99.9 | 50 | NONE | " | NO ABRASION | " |
| 32 | 0.5 | TiO₂; 0.1 μm | SiO₂; 0.5 μm FLUORINE RESIN; 0.5 μm | 90 | 60 | " | " | " | " |
| 33 | 2.5 | Cr₃C₂; 5 μm | TiO₂; 20 μm | 90 | 60 | PRESENT | " | " | " |

Remark
1) Tests with mark * are not in the present invention.

It is found from Tables 3 to 5 that in tests Nos. 29 to 31, 33 among 33 tests, the corrosion rate of the low corrosion resistant member 10 was 1.0 g/m²/hr or more and the corrosion resistance is not excellent. It is found that in tests Nos. 1 to 28 and 32 in which the insulating ceramic film has a resistivity of 10⁸ Ωcm or more, a film thickness of 0.4 μm or more; a film length L of 60 mm or more and a coverage ratio of 90% or more to 99.999% or less, the corrosion rate is low, the galvanic corrosion and crevice corrosion can be prevented and abrasion resistance is excellent.

It is confirmed that a sample having a film which was coated with a fluorine resin in Test No. 32 had a remarkable abrasion resistance effect in comparison with a sample having no synthetic resin film.

EXPERIMENTAL EXAMPLE 2 similar test was conducted by changing the materials of the pipe members of the experimental example 1. The low corrosion resistant member 10 was made of API-L80 grade intermediate carbon steel. The high corrosion resistant member 11 was made of UNSNO.N 08825 (22 Cr - 42 Ni - 3 Mo) or UNSNO.N 10276 (16 Cr - 56 Ni - 16 Mo) and was coated with an adherent insulating film. The coupling member 12 was made of UNSNO. N 08825 (22 Cr - 42 Ni - 3 Mo) or UNSNO. N 10276 (16 Cr - 56 Ni - 16 Mo) and was coated with an adherent insulating film.

The lower adherent insulating film was made of Cr, Cr₂O₃, CrN, Cr₇C₃, Ni or NiO. The upper insulating ceramic film 15 was made of Al₂O₃, Si₃N₄, Ta₂O₅, SiO₂, AlN, or BN having a resistivity of 10⁸ Ωcm or more. For comparison, semiconductive TiO having a resistivity of 10³ Ωcm was used. CrN was applied by nitriding treatment using ions. Cr₇C₃ was applied by carburizing treatment using ions. Al₂O₃, Ta₂O₅ or TiO₂ was applied by sputtering method, Si₃N₄ or BN was applied by plasma CVD method. Cr, Cr₂O₃, Ni, NiO, SiO₂ or AlN was applied by ion plating method. Similar test was conducted for a sample which was coated with a fluorine resin for protecting the insulating ceramic film.

Test results are shown in Tables 6 to 8.

TABLE 6

| | LOW CORROSION RESISTANT MEMBER 10 | COUPLING MEMBER 12 | | | | | |
|---|---|---|---|---|---|---|---|
| | | BASE | STRESS RELAXATION LAYER | ISULATING CERAMIC FILM | | | |
| TEST NOS | CORROSION RATE ($g/m^2 \cdot hr$) | MATERIAL UNSNO. | MATERIAL; THICKNESS (μm) | MATERIAL; THICKNESS (μm) | COVERAGE RATIO (%) | L2 (mm) | CREVICE CORROSION |
| 101 | 0.5 | N08825 | Cr; 0.1 | AlN; 0.4 | 90 | 60 | NONE |
| 102 | " | " | Cr; 2 | BN; 4 | 99.9 | " | " |
| 103 | " | " | Cr; 5 | $Ta_2O_5$; 12 | 99.99 | " | " |
| 104 | " | " | $Cr_2O_3$; 0.1 | $Si_3N_4$; 0.4 | 90 | " | " |
| 105 | " | " | $Cr_2O_3$; 1 | $Al_2O_3$; 5 | 99.9 | " | " |
| 106 | " | " | $Cr_2O_3$; 5 | $SiO_2$; 40 | 99.999 | " | " |
| 107 | " | " | CrN; 0.1 | BN; 0.4 | 90 | " | " |
| 108 | " | " | CrN; 0.3 | AlN; 1 | 95 | " | " |
| 109 | " | " | CrN; 0.5 | $Al_2O_3$; 4 | 99 | " | " |
| 110 | " | " | CrN; 2 | $Si_3N_4$; 5 | 99.9 | " | " |
| 111 | " | " | CrN; 5 | $Ta_2O_5$; 10 | 99.99 | " | " |
| 112 | " | " | $Cr_7C_3$; 0.1 | $Si_3N_4$; 0.4 | 90 | " | " |
| 113 | " | " | $Cr_7C_3$; 0.4 | $SiO_2$; 1 | 97 | " | " |
| 114 | " | " | $Cr_7C_3$; 3 | $Al_2O_3$; 8 | 99.99 | " | " |
| 115 | " | " | $Cr_7C_3$; 5 | $Ta_2O_5$; 2 | 99.9 | " | " |
| 116 | " | " | Ni; 0.1 | $Si_3N_4$; 0.4 | 0 | " | " |
| 117 | " | " | Ni; 1 | AlN; 3 | 99.9 | " | " |
| 118 | " | " | Ni; 5 | BN; 30 | 99.999 | " | " |
| 119 | " | " | NiO; 0.1 | $SiO_2$; 0.4 | 90 | " | " |

| | COUPLING MEMBER 12 | | HIGH CORROSION RESISTANT MEMBER 11 | |
|---|---|---|---|---|
| | | | BASE | CORROSION |
| TEST NOS | ABRASION | EROSION CORROSION | MATERIAL UNSNO. | RATE ($g/m^2 \cdot hr$) |
| 101 | NONE | NO ABRASION | N08825 | 0.01 |
| 102 | " | " | " | " |
| 103 | " | " | " | " |
| 104 | " | " | " | " |
| 105 | " | " | " | " |
| 106 | " | " | " | " |
| 107 | " | " | " | " |
| 108 | " | " | " | " |
| 109 | " | " | " | " |
| 110 | " | " | " | " |
| 111 | " | " | " | " |
| 112 | " | " | " | " |
| 113 | " | " | " | " |
| 114 | " | " | " | " |
| 115 | " | " | " | " |
| 116 | " | " | " | " |
| 117 | " | " | " | " |
| 118 | " | " | " | " |
| 119 | " | " | " | " |

TABLE 7

| | LOW CORROSION RESISTANT MEMBER 10 | COUPLING MEMBER 12 | | | | | |
|---|---|---|---|---|---|---|---|
| | | BASE | STRESS RELAXATION LAYER | ISULATING CERAMIC FILM | | | |
| TEST NOS | CORROSION RATE ($g/m^2 \cdot hr$) | MATERIAL UNSNO. | MATERIAL; THICKNESS (μm) | MATERIAL; THICKNESS (μm) | COVERAGE RATIO (%) | L2 (mm) | CREVICE CORROSION |
| 120 | 0.5 | N08825 | NiO; 2 | $Ta_2O_5$; 5 | 99.9 | 60 | NONE |
| 121 | " | " | NiO; 5 | $Al_2O_3$; 10 | 99.99 | " | " |

TABLE 7-continued

| | | | | | | |
|---|---|---|---|---|---|---|
| 122 | " | N10276 | Cr; 0.1 | AlN; 0.4 | 90 | " | " |
| 123 | " | " | Cr$_2$O$_3$; 0.1 | Ta$_2$O$_5$; 0.4 | 90 | " | " |
| 124 | " | " | CrN; 0.1 | AlN; 0.4 | 90 | " | " |
| 125 | " | " | CrN; 0.2 | BN; 1 | 95 | " | " |
| 126 | " | " | CrN; 0.5 | Ta$_2$O$_5$; 3 | 99 | " | " |
| 127 | " | " | CrN; 1 | Si$_3$N$_4$; 5 | 99.9 | " | " |
| 128 | " | " | CrN; 3 | Al$_2$O$_3$; 10 | 99.99 | " | " |
| 129 | " | " | CrN; 5 | SiO$_2$; 60 | 99.999 | " | " |
| 130 | " | " | Ni; 0.1 | BN; 0.4 | 90 | " | " |
| 131 | " | " | Ni; 1 | Si$_3$N$_4$; 3 | 99 | " | " |
| 132 | " | " | Ni; 5 | AlN; 8 | 99.9 | " | " |
| 133 | " | " | NiO; 0.1 | Ta$_2$O$_5$; 0.4 | 90 | " | " |
| 134 | " | " | NiO; 1 | Al$_2$O$_3$; 5 | 99.9 | " | " |
| 135 | " | " | NiO; 5 | SiO$_2$; 30 | 9.999 | " | " |
| 136 | " | N08825 | Cr; 0.1 + Cr$_2$O$_3$; 0.5 | Ta$_2$O$_5$; 0.4 | 90 | " | " |

| | COUPLING MEMBER 12 | | HIGH CORROSION RESISTANT MEMBER 11 | |
|---|---|---|---|---|
| TEST NOS | ABRASION | EROSION CORROSION | BASE MATERIAL UNSO. | CORROSION RATE (g/m$^2$ · hr) |
| 120 | NONE | NO ABRASION | N08825 | 0.01 |
| 121 | " | " | " | " |
| 122 | " | " | N10276 | 0.001 |
| 123 | " | " | " | " |
| 124 | " | " | " | " |
| 125 | " | " | " | " |
| 126 | " | " | " | " |
| 127 | " | " | " | " |
| 128 | " | " | " | " |
| 129 | " | " | " | " |
| 130 | " | " | " | " |
| 131 | " | " | " | " |
| 132 | " | " | " | " |
| 133 | " | " | " | " |
| 134 | " | " | " | " |
| 135 | " | " | " | " |
| 136 | " | " | N08825 | 0.01 |

TABLE 8

| | LOW CORROSION RESISTANT MEMBER 10 | COUPLING MEMBER 12 | | | | | |
|---|---|---|---|---|---|---|---|
| TEST NOS | CORROSION RATE (g/m$^2$ · hr) | BASE MATERIAL UNSNO. | STRESS RELAXATION LAYER MATERIAL; THICKNESS (μm) | ISULATING CERAMIC FILM MATERIAL; THICKNESS (μm) | COVERAGE RATIO (%) | L2 (mm) | CREVICE CORROSION |
| 137 | 0.5 | N08825 | Cr; 0.2 + CrN; 1 | Si$_3$N$_4$; 3 | 99 | 60 | NONE |
| 138 | " | " | Cr$_2$O$_3$; 1 + Cr$_7$C$_3$; 4 | BN; 10 | 99.99 | " | " |
| 139 | " | " | Cr$_7$C$_3$; 0.5 + CrN; 1 | Al$_2$O$_3$; 5 | 99.9 | " | " |
| 140 | " | " | Ni; 0.1 + NiO; 4 | SiO$_2$; 50 | 99.999 | " | " |
| 141 | " | " | Cr$_2$O$_3$; 0.5 + CrN; 1.5 | AlN; 1 | 92 | " | " |
| 142 | 2.0 | " | Cr; 0.1 | AlN; 0.3 | 90 | " | PRESENT |
| 143 | 1.5 | " | CrN; 1 | BN; 0.5 | 92 | 50 | NONE |
| 144 | 1.0 | " | NiO; 5 | SiO$_2$; 0.5 | 88 | 60 | PRESENT |
| 145 | 0.5 | " | CrN; 1 | Si$_3$N$_4$; 3 + FLUORINE RESIN; 50 | 99.9 | " | NONE |
| 146 | " | " | Ni; 0.05 | Ta$_2$O$_5$; 0.5 | 92 | " | " |
| 147 | " | " | Cr$_2$O$_3$; 7 | Al$_2$O$_3$; 15 | 99.999 | " | " |
| 148 | 2.5 | " | Cr; 1 | TiO$_2$; 5 | 90 | " | PRESENT |

TABLE 8-continued

| | TEST NOS | COUPLING MEMBER 12 | | HIGH CORROSION RESISTANT MEMBER 11 | |
|---|---|---|---|---|---|
| | | ABRASION | EROSION CORROSION | BASE MATERIAL UNSO. | CORROSION RATE (g/m² · hr) |
| | 137 | NONE | NO ABRASION | N08825 | 0.01 |
| | 138 | " | " | " | " |
| | 139 | " | " | " | " |
| | 140 | " | " | " | " |
| | 141 | " | " | " | " |
| | 142 | " | ABRAION PRESENT | " | " |
| | 143 | " | NO ABRASION | " | " |
| | 144 | " | ABRAION PRESENT | " | " |
| | 145 | " | NO ABRASION | " | " |
| | 146 | PRESENT | " | " | " |
| | 147 | " | " | " | " |
| | 148 | NONE | " | " | " |

As is apparent from Tables 6, 7 and 8, tests Nos. 142 to 144 and 148 of 48 tests showed inferior corrosion resistance while the other tests 101 to 141 and 145 in accordance with the present invention show remarkable galvanic and crevice corrosion resistance effect and excellent abrasion resistance.

EXPERIMENTAL EXAMPLE 3

Similar test was conducted by changing the materials of the pipe members of the experimental example 1. The low corrosion resistant member 10 was made of API-L80 grade intermediate carbon steel. The high corrosion resistant member 11 was made of UNSNO.N 3180 (duplex stainless steel). The coupling member 12 was made of UNSNO.N 31803 (duplex stainless steel) and was coated with an adherent insulating film.

The lower adherent insulating film was made of Cr, $Cr_2O_3$, CrN or $Cr_7C_3$. The upper insulating ceramic film 13 was made of $Al_2O_3$, $Si_3N_4$, $Ta_2O_5$, $SiO_2$, AlN, or BN having a resistivity of $10^8$ $\Omega$cm or more. For comparison, semiconductive $TiO_2$ having a resistivity of $10^7$ $\Omega$cm was used. CrN was applied by nitriding treatment using ions. $Cr_7C_3$ was applied by sputtering method, $Si_3N_4$ or BN was applied by plasma CVD method. Cr, $Cr_2O_3$, $SiO_2$ or AlN was applied by ion plating method. Similar test was conducted for a sample which was coated with a fluorine resin for protecting the insulating ceramic film. Test results are shown in Tables 9 and 10.

TABLE 9

| | LOW CORROSION RESISTANT MEMBER 10 | COUPLING MEMBER 12 | | | | | | | HIGH CORROSION RESISTANT MEMBER 11 |
|---|---|---|---|---|---|---|---|---|---|
| | | STRESS RELAXATION LAYER | INSULATING CERAMIC FILM | | | | | | |
| TEST NOS | CORROSION RATE (g/m² · hr) | MATERIAL; THICKNESS (μm) | MATERIAL; THICKNESS (μm) | COVERAGE RATIO (%) | L2 (mm) | CREVICE CORROSION | ABRASION | EROSION CORROSION | CORROSION RATE (g/m² · hr) |
| 201 | 0.5 | Cr; 0.1 | bn; 0.4 | 90 | 60 | NONE | NONE | NO ABRASION | 0.02 |
| 202 | " | Cr; 1 | $Al_2O_3$; 3 | 99.9 | " | " | " | " | " |
| 203 | " | Cr; 5 | AlN; 10 | 99.99 | " | " | " | " | " |
| 204 | " | $Cr_2O_3$; 0.1 | $Ta_2O_5$; 0.4 | 90 | " | " | " | " | " |
| 205 | " | $Cr_2O_3$; 2 | $Si_3N_4$; 5 | 99.99 | " | " | " | " | " |
| 206 | " | $Cr_2O_3$; 5 | $SiO_2$; 50 | 99.999 | " | " | " | " | " |
| 207 | " | CrN; 0.1 | AlN; 0.4 | 90 | " | " | " | " | " |
| 208 | " | CrN; 0.2 | BN; 1 | 95 | " | " | " | " | " |
| 209 | " | CrN; 0.5 | $Si_3N_4$; 3 | 99.9 | " | " | " | " | " |
| 210 | " | CrN; 1 | $Ta_2O_5$; 5 | 99.99 | " | " | " | " | " |
| 211 | " | CrN; 5 | $Al_2O_3$; 8 | 99.999 | " | " | " | " | " |
| 212 | " | $Cr_7C_3$; 0.1 | AlN; 0.4 | 90 | " | " | " | " | " |
| 213 | " | $Cr_7C_3$; 0.5 | $Si_3N_4$; 1 | 98 | " | " | " | " | " |
| 214 | " | $Cr_7C_3$; 1 | BN; 5 | 99.9 | " | " | " | " | " |

TABLE 10

| TEST NOS | LOW CORROSION RESISTANT MEMBER 10 CORROSION RATE (g/m²·hr) | STRESS RELAXATION LAYER MATERIAL; THICKNESS (μm) | COUPLING MEMBER 12 INSULATING CERAMIC FILM MATERIAL; THICKNESS (μm) | COVERAGE RATIO (%) | L2 (mm) | CREVICE CORROSION | ABRASION | EROSION CORROSION | HIGH CORROSION RESISTANT MEMBER 11 CORROSION RATE (g/m²·hr) |
|---|---|---|---|---|---|---|---|---|---|
| 215 | 0.5 | Cr₇C₃; 5 | Ta₂O₅; 20 | 99.999 | 60 | NONE | NONE | NO ABRASION | 0.02 |
| 216 | " | Cr; 0.1 + CrN; 0.5 | Si₃N₄; 2 | 99.9 | " | " | " | " | " |
| 217 | " | Cr₂O₃; 0.1 + Cr₇C₃; 5 | Al₂O₃; 8 | 99.99 | " | " | " | " | " |
| 218 | " | Cr; 0.2 + Cr₂O₃; 1 | AlN; 5 | 99.9 | " | " | " | " | " |
| 219 | " | Cr₇C₃; 0.1 + CrN; 0.5 | Ta₂O₅; 0.4 | 90 | " | " | " | " | " |
| 220 | " | Cr; 1 + Cr₇C₃; 4 | BN; 15 | 99.999 | " | " | " | " | " |
| 221 | " | Cr₂O₃; 2 + CrN; 3 | SiO₂; 50 | 99.999 | " | " | " | " | " |
| 222 | " | CrN; 0.5 | Si₃N₄; 2 FLUORINE RESIN; 50 | 99.9 | " | " | " | " | " |
| 223 | 2.0 | Cr; 0.1 | Al₂O₃; 0.3 | 90 | " | PRESENT | " | ABRASION PRESENT | " |
| 224 | 1.5 | Cr₇C₃; 1 | BN; 0.5 | 89 | " | " | " | NO ABRASION | " |
| 225 | 1.0 | Cr₂O₃; 2 | Ta₂O₅; 1 | 92 | 50 | NONE | " | " | " |
| 226 | 0.5 | CrN; 5 | AlN; 10 | 99.99 | " | " | " | " | " |
| 227 | " | Cr; 0.05 | Al₂O₃; 0.4 | 90 | 60 | " | PRESENT | " | " |
| 228 | " | CrN; 6 | AlN; 10 | 99.99 | " | " | " | " | " |
| 229 | 2.5 | CrN; 0.5 | *TiO₂; 3 | 90 | " | PRESENT | NONE | " | " |

*RESISTIVITY $10^7$ Ωcm

As is apparent from Tables 9 and 10, tests Nos. 223, 226 and 229 of 29 tests showed the corrosion rate of the low corrosion resistant member 10 which is 1.0 (g/m²)/h or more and inferior corrosion resistance while the other in accordance with the present invention show remarkable galvanic and crevice corrosion resistance effect and excellent abrasion resistance.

EXPERIMENTAL EXAMPLE 4

Similar test was conducted by changing the materials of the pipe members of the experimental example 1. The low corrosion resistant member 10 was made of API-L80 grade intermediate carbon steel. The high corrosion resistant member 11 was made of UNSNO.S 50400 (9Cr - 1Mo). The coupling member 12 was made of API-L80 grade intermediate carbon steel or UNSNO.S50400 and was coated with an adherent insulating film.

The lower adherent insulating film was made of Fe₂O₃ or Fe₄N. The upper insulating ceramic film 13 was made of Al₂O₃, Si₃N₄, Ta₂O₅, SiO₂, AlN or BN having a resistivity of $10^8$ Ωcm or more. For comparison, semiconductive TiO₂ having a resistivity of $10^7$ Ωcm was used. Fe₄N was applied by nitriding treatment using ions. Fe₂O₃ was applied by oxidation treatment using ions. Al₂O₃, Ta₂O₅ or TiO₂ was applied by sputtering method, Si₃N₄ or BN was applied by plasma CVD method. Cr, Cr₂O₃, Ni, NiO, SiO or AlN was applied by ion plating method. Similar test was conducted for a sample which was coated with a fluorine resin for protecting the insulating ceramic film. Test results are shown in Table 11.

TABLE 11

| TEST NOS | LOW CORROSION RESISTANT MEMBER 10 CORROSION RATE (g/m²·hr) | COUPLING MEMBER 12 BASE MATERIAL | STRESS RELAXATION LAYER MATERIAL; THICKNESS (μm) | INSULATING CERAMIC FILM MATERIAL; THICKNESS (μm) | COVERAGE RATIO (%) | L2 (mm) | CREVICE CORROSION |
|---|---|---|---|---|---|---|---|
| 301 | 0.5 | L80 | Fe₂O₃; 0.1 | Ta₂O₅; 0.4 | 90 | 60 | NONE |
| 302 | " | " | Fe₂O₃; 1 | Al₂O₃; 5 | 99.9 | " | " |
| 303 | " | " | Fe₂O₃; 3 | SiO₂; 50 | 99.999 | " | " |
| 304 | " | " | Fe₂O₃; 5 | AlN; 20 | 99.99 | " | " |
| 305 | " | " | Fe₂O₃; 0.5 | BN; 2 | 95 | " | " |
| 306 | " | " | Fe₂O₃; 0.2 | Si₃N₄; 1 | 92 | " | " |
| 307 | " | " | Fe₄N; 0.1 | AlN; 0.4 | 90 | " | " |
| 308 | " | " | Fe₄N; 1 | BN; 3 | 99.9 | " | " |
| 309 | " | " | Fe₄N; 3 | Al₂O₃; 40 | 99.999 | " | " |

TABLE 11-continued

| | | | | | | | |
|---|---|---|---|---|---|---|---|
| 310 | " | " | Fe$_4$N; 5 | Si$_3$N$_4$; 1 | 92 | " | " |
| 311 | " | " | Fe$_4$N; 0.5 | SiO$_2$; 10 | 99.99 | " | " |
| 312 | " | " | Fe$_4$N; 0.2 | Ta$_2$O$_5$; 0.5 | 95 | " | " |
| 313 | " | UNSNO.S50400 | Fe$_2$O$_3$; 0.1 | Si$_3$N$_4$; 0.4 | 90 | " | " |
| 314 | " | " | Fe$_2$O$_3$; 0.1 | Al$_2$O$_3$; 8 | 99.99 | " | " |
| 315 | " | " | Fe$_2$O$_3$; 5 | SiO$_2$; 70 | 99.999 | " | " |
| 316 | 0.5 | UNSNO.S50400 | Fe$_4$N; 0.1 | BN; 0.4 | 90 | 60 | NONE |
| 317 | " | " | Fe$_4$N; 3 | AlN; 5 | 99.9 | " | " |
| 318 | " | " | Fe$_4$N; 5 | Ta$_2$O$_5$; 10 | 99.99 | " | " |
| 319 | 2.0 | " | Fe$_4$N; 0.2 | Si$_3$N$_4$; 0.3 | 90 | " | " |
| 320 | 1.5 | " | Fe$_4$N; 0.1 | BN; 0.5 | 85 | " | PRESENT |
| 321 | 1.0 | " | Fe$_2$O$_3$; 1 | SiO$_2$; 5 | 90 | 50 | " |
| 322 | 0.5 | " | Fe$_2$O$_3$; 0.1 | AlN; 0.4 FLUORINE RESIN; 50 | 90 | 60 | NONE |
| 323 | 0.5 | " | Fe$_2$O$_3$; 0.3 + Fe$_4$N; 1 | SiO$_2$; 0.4 | 90 | " | " |
| 324 | " | " | Fe$_2$O$_3$; 5.5 | Al$_2$O$_3$; 10 | 99.99 | " | " |
| 325 | 2.5 | " | Fe$_4$N; 3 | *TiO$_2$; 10 | 90 | " | PRESENT |

| | COUPLING MEMBER 12 | | HIGH CORROSION RESISTANT MEMBER 11 |
|---|---|---|---|
| TEST NOS | ABRASION | EROSION CORROSION | CORROSION RATE (g/m$^2$ · hr) |
| 301 | NONE | NO ABRASION | 0.1 |
| 302 | " | " | " |
| 303 | " | " | " |
| 304 | " | " | " |
| 305 | " | " | " |
| 306 | " | " | " |
| 307 | " | " | " |
| 308 | " | " | " |
| 309 | " | " | " |
| 310 | " | " | " |
| 311 | " | " | " |
| 312 | " | " | " |
| 313 | " | " | " |
| 314 | " | " | " |
| 315 | " | " | " |
| 316 | NONE | NO ABRASION | 0.1 |
| 317 | " | " | " |
| 318 | " | " | " |
| 319 | " | " | " |
| 320 | " | PRESENT | " |
| 321 | " | NO ABRASION | " |
| 322 | " | " | " |
| 323 | " | " | " |
| 324 | " | " | " |
| 325 | " | " | " |

*RESISTIVITY $10^7$ Ωm

As is apparent from Table 11, tests Nos. 319 to 321 and 325 of 25 tests shown the corrosion rate of the low corrosion resistant member 10 which is 1.0 (g/m$^2$)/h and inferior corrosion resistance while the other tests in accordance with the present invention shown remarkable galvanic and crevice corrosion resistance effect and excellent abrasion resistance. It is confirmed that a sample which was coated with fluorine resin of No. 322 was effective to prevent abrasion in comparison with a sample having no organic film. In test No. 324, only abrasion was found since the longer film was not in the range of 0.05 to 5 μm.

EXPERIMENTAL EXAMPLE 5

Similar test was conducted by changing the materials of the pipe members of the experimental example 1. the low corrosion resistant member 10 was made of API-L80 grade intermediate carbon steel. The high corrosion resistant member 11 was made of UNSNO.S 31803 (duplex stainless steel). The coupling member 12 was made of UNSNO.S 31803 and was coated with an adherent insulating film.

The adherent insulating film was coated with a stress relaxation film and thereafter coated with amorphous Al$_2$O$_3$, Si$_3$N$_4$, Ta$_2$O$_5$, SiO$_2$ or ZrO$_2$ by ion plating or plasma CVD method as shown in Table 12. Coating conditions are also shown in Table 12.

TABLE 12

| | METHODS | CONDITIONS |
|---|---|---|
| Al$_2$O$_3$ | PLASMA CVD | GASES: CO$_2$, AlCl$_3$, CH$_4$ TEMP.: 500° C. OUTPUT: 400 W |
| Si$_3$O$_4$ | " | GASES: N$_2$, SiCl$_4$, H$_2$ TEMP.: 500° C. OUTPUT: 600 W |
| Ta$_2$O$_5$ | ION PLATING | TARGET: Ta ATMOSPHERE: O$_2$ PRESSURE: 10$^{-4}$ torr |
| SiO$_2$ | " | TARGET: Si ATMOSPHERE: O$_2$ |

TABLE 12-continued

| | METHODS | CONDITIONS |
|---|---|---|
| $ZrO_2$ | " | PRESSURE: $10^{-4}$ torr<br>TARGET: Zr<br>ATMOSPHERE: $O_2$<br>PRESSURE: $10^{-4}$ torr |
| CRYSTALLINE $Al_2O_3$ | PLASMA SPRAYING | RAW MATERIAL: $Al_2O_3$ POWDER |

Crystallization treatment was executed by heating only the surface areas of respective layers of amorphous materials by a gas burner. At this time, for comparison test was also conducted on a relaxation layer made of only an amorphous material which was not subjected to the crystallization treatment and a relaxation layer made of only crystalline material, both layers having the surfaces which were coated with a fluorine resin. The results of this test are shown in Table 13.

TABLE 13

| | LOW CORROSION RESISTANT MEMBER 11 | COUPLING MEMBER 12 | | | |
|---|---|---|---|---|---|
| TEST NOS | CORROSION RATE ($g/m^2 \cdot hr$) | STRESS RELAXATION LAYER MATERIAL; THICKNESS (μm) | LOWER FILM MATERIAL | UPPER FILM MATERIAL | COVERAGE RATIO (%) | THICKNESS (μm) |
| 401 | 0.5 | — | AMORPHOUS $Al_2O_3$ | CRYSTALLINE $Al_2O_3$ | 90 | 2 |
| 402 | " | — | AMORPHOUS $Si_3N_4$ | CRYSTALLINE $Si_3N_4$ | 91 | 0.5 |
| 403 | " | — | AMORPHOUS $Ta_2O_5$ | CRYSTALLINE $Ta_2O_5$ | 95 | 5 |
| 404 | " | Si; 1 | AMORPHOUS $SiO_2$ | CRYSTALLINE $SiO_2$ | 99 | 1 |
| 405 | " | TiN; 0.1 | AMORPHOUS $Al_2O_3$ | CRYSTALLINE $Al_2O_3$ | 90 | 5 |
| 406 | " | TaC; 5 | AMORPHOUS $Si_3N_4$ | CRYSTALLINE $Si_3N_4$ | 95 | 2 |
| 407 | " | $Cr_3C_2$; 2 | AMORPHOUS $ZrO_2$ | CRYSTALLINE $ZrO_2$ | 95 | 3 |
| 408 | " | SiC; 2 | AMORPHOUS $Si_3N_4$ | CRYSTALLINE $Si_3N_4$ | 98 | 2 |
| 409 | " | CrN; 2 | AMORPHOUS $Al_2O_3$<br>FLUORINE RESIN; 0.5 μm | CRYSTALLINE $Al_2O_3$ | 99 | 2 |
| 410 | " | TiN; 1 | AMORPHOUS $Al_2O_3$ | CRYSTALLINE $Si_3N_4$ | 90 | 2 |
| 411 | " | Si; 1 | AMORPHOUS $Si_3N_4$ | CRYSTALLINE $Si_3N_4$ | 95 | 1 |
| 412 | " | Ta; 1 | AMORPHOUS $Ta_2O_5$ | CRYSTALLINE $Ta_2O_5$ | 96 | 5 |
| 413 | " | Si; 1 | AMORPHOUS $SiO_2$ | CRYSTALLINE $SiO_2$ | 97 | 3 |
| 414 | " | CrN; 1 | AMORPHOUS $Si_3N_4$ | CRYSTALLINE $Si_3N_4$ | 99 | 5 |
| 415 | 1.0 | — | CRYSTALLINE $Al_2O_3$ | CRYSTALLINE $Al_2O_3$ | 98 | 50 |
| 416 | " | CrN; 1 | CRYSTALLINE $Al_2O_3$ | CRYSTALLINE $Al_2O_3$ | 97 | 50 |
| 417 | " | $Cr_{23}C_6$; 1 | CRYSTALLINE $Al_2O_3$ | CRYSTALLINE $Al_2O_3$ | 95 | 150 |
| 418 | " | Si; 1 | AMORPHOUS $SiO_2$ | CRYSTALLINE $SiO_2$ | 90 | 5 |
| 419 | 1.2 | CrN; 1 | AMORPHOUS $Si_3N_4$ | CRYSTALLINE $Si_3N_4$ | 91 | 0.3 |
| 420 | 1.0 | CrN; 2 | AMORPHOUS $Al_2O_3$ | CRYSTALLINE $Al_2O_3$ | 80 | 5 |
| 421 | 1.2 | TiN; 0.05 | AMORPHOUS $Al_2O_3$ | CRYSTALLINE $Al_2O_3$ | 90 | 5 |
| 422 | 1.0 | TiN; 5 | AMORPHOUS $Al_2O_3$ | CRYSTALLINE $Al_2O_3$ | 90 | 5 |

| | COUPLING MEMBER 12 | | | HIGH CORROSION RESISTANT |
|---|---|---|---|---|
| TEST NOS | FILM THICKNESS CHANGE RATIO (%) | LENGTH L (mm) | ABRASION RATIO (%) | MEMBER 11 CORROSION RATE ($g/m^2 \cdot hr$) |
| 401 | 0 | 60 | 0.01 | 0.01 |
| 402 | 0 | " | 0.02 | " |
| 403 | 0 | " | 0.02 | " |
| 404 | 0 | " | NO ABRASION | " |
| 405 | 0 | " | " | " |
| 406 | 0 | " | " | " |
| 407 | 0 | " | " | " |
| 408 | 0 | " | " | " |
| 409 | 0 | " | " | " |
| 410 | 0 | " | " | " |
| 411 | 0 | " | " | " |
| 412 | 0 | " | " | " |
| 413 | 0 | " | " | " |
| 414 | 0 | " | " | " |
| 415 | 0 | 60 | ABRASION PRESENT | 0.01 |
| 416 | 0 | " | ABRASION | " |

TABLE 13-continued

|     |   |    |                      |   |
|-----|---|----|----------------------|---|
| 417 | 0 | "  | PRESENT ABRASION     | " |
| 418 | 0 | 50 | PRESENT NO ABRASION  | " |
| 419 | 0 | "  | "                    | " |
| 420 | 0 | "  | "                    | " |
| 421 | 0 | "  | ABRASION PRESENT     | " |
| 422 | 0 | "  | ABRASION PRESENT     | " |

$$\text{FILM THICKNESS CHANGE RATIO} = \frac{\text{INITIAL FILM THICKNESS} - \text{FILM THICKNESS AFTER TEST}}{\text{INITIAL FILM THICKNESS}} \times 100$$

$$\text{ABRASION RATIO} = \frac{\text{CURRENT DENSITY AFTER TEST}}{\text{CURRENT DENSITY OF UNCOATED BASE MATERIAL}} \times 100$$

As is apparent from Table 13, in tests Nos. 404 to 409, it was found that the samples had excellent galvanic corrosion resistance, crevice corrosion resistant and abrasion resistance. On the other hand, in comparative tests Nos. 410 to 414, excellent galvanic corrosion resistance and crevice corrosion resistance was found, but solution of the film per se was confirmed. In comparative tests Nos. 415 to 422, sufficient galvanic corrosion resistance was not exhibited.

EXPERIMENTAL EXAMPLE 6

Similar test was conducted by changing the materials of the pipe members of the experimental example 1. The low corrosion resistant member 10 was made of API-L80 grade intermediate carbon steel. The high corrosion resistant member 11 was made of UNSNO.N 08825 (22 Cr - 42 Ni - 3 Mo). The coupling member 12 was made of API-L80 grade intermediate carbon steel or UNSNO.N 08825 (22 Cr - 42 Ni - 3 Mo) and was coated with an adherent insulating film of the present invention.

The adherent insulating film comprised a lower metallic film which was formed by ion plating and an upper insulating ceramic film which was made of $Al_2O_3$, $Si_3N_4$, $Ta_2O_5$, $SiO_2$, AlN, BN or $ZrO_2$ by ion plating or plasma CVD method. Similar tests was also conducted on a sample which was coated with a fluorine resin for protecting the insulating ceramic film. Diffusion treatment was successively conducted in a chamber having an coated upper layer. Test results are shown in Table 14.

TABLE 14

| | LOW CORROSION RESISTANT MEMBER 11 | COUPLING MEMBER 12 | | | | | |
|---|---|---|---|---|---|---|---|
| | CORROSION | LOWER DIFFUSION LAYER 34 | | INSULATING CERAMIC FILM | | | |
| TEST NOS | RATE ($g/m^2 \cdot hr$) | TEMPERATURE (°C.) | MATERIAL; THICKNESS (μm) | MATERIAL; THICKNESS (μm) | COVERAGE RATIO (%) | L2 (mm) | CREVICE CORROSION |
| 501 | 0.5 | 500 | Si; 0.5 | $Si_3N_4$; 0.5 | 90 | 60 | NONE |
| 502 | " | 500 | Al; 0.5 | $Al_2O_3$; 5 | 92 | " | " |
| 503 | " | 550 | Al; 1 | AlN; 2 | 95 | " | " |
| 504 | " | 500 | B; 2 | BN; 3 | 95 | " | " |
| 505 | " | 450 | Si; 0.5 | $SiO_2$; 10 | 99.99 | " | " |
| 506 | " | 300 | Ta; 0.2 | $Ta_2O_5$; 0.5 | 90 | " | " |
| 507 | " | 500 | Zr; 0.5 | $ZrO_2$; 3 | 95 | " | " |
| 508 | " | 200 | Si; 0.1 | $Si_3N_4$; 1 | 90 | " | " |
| 509 | " | 250 | Al; 0.01 | AlN; 2 | 92 | " | " |
| 510 | " | — | — | $Al_2O_3$; 4 | 99.999 | " | " |
| 511 | " | — | — | $SiO_2$; 1 | 90 | " | " |
| 512 | " | — | — | BN; 5 | 95 | " | " |
| 513 | " | — | — | $ZrO_2$; 2 | 95 | " | " |
| 514 | 1.0 | 500 | Si; 0.5 | $Si_3N_4$; 0.3 | 90 | " | PRESENT |
| 515 | 1.5 | 500 | Al; 0.5 | $Al_2O_3$; 3 | 80 | " | " |
| 516 | 1.0 | 250 | Al; 0.05 | Aln; 1 | 95 | 50 | " |
| 517 | 0.5 | 500 | Si; 0.5 | $Si_3N_4$; 1 | 90 | 60 | NONE |
| | | | FLUORINE RESIN; 1 μm | | | | |

| | COUPLING MEMBER 12 | | HIGH CORROSION RESISTANT MEMBER 11 CORROSION |
|---|---|---|---|
| TEST NOS | ABRASION | EROSION CORROSION | RATE ($g/m^2 \cdot hr$) |
| 501 | NONE | NO ABRASION | 0.01 |
| 502 | " | " | " |
| 503 | " | " | " |

TABLE 14-continued

| | | | |
|---|---|---|---|
| 504 | " | " | " |
| 505 | " | " | " |
| 506 | " | " | " |
| 507 | " | " | " |
| 508 | PRESENT | " | " |
| 509 | " | " | " |
| 510 | " | " | " |
| 511 | " | " | " |
| 512 | " | " | " |
| 513 | " | " | " |
| 514 | NONE | ABRASION PRESENT | " |
| 515 | " | NO ABARSION | " |
| 516 | " | " | " |
| 517 | " | " | " |

As is seen from Table 14, abrasion is found in comparative tests NOs. 508 to 513 of 17 tests. In contrast to this, it is found that corrosion rate is low and the galvanic corrosion and crevice corrosion is prevented and the abrasion resistance is excellent in tests Nos. 501 to 507 and 517 of the present invention.

EXPERIMENTAL EXAMPLE 17

Results of test on hydrogen brittlement are shown.

The low corrosion resistant member 10 was made of API-L80 grade intermediate carbon steel. The high corrosion resistant member 11 was made of UNSNO.S31803 (duplex stainless steel). The coupling member 12 was made of UNSNO.S31803 (duplex phase stainless steel). The film 13 included a lower film made of 0.2 m TiN and an upper film made of 5 μm $Al_2O_3$, $Si_3N_4$, $Ta_2O_5$, $SiO_2$, AlN, Bn or $ZrO_2$.

Step 1

The sample was left partially in one atmospheric pressure $CO_2$ environment and partially in a solution of 5% NaCl at 150° C. for 720 hr.

Step 2

The sample was then left partially in one atmospheric pressure $CO_2$ environment and partially in a solution of 5% NaCl at 25° C. for 720 hr.

The samples which were subjected to steps 1 and 2 were investigated to determine whether or not cracks were formed in the U-bent portion. The results are shown in Table 15.

TABLE 15

| TEST NOS. | SIZE OF COUPLING MEMBER (mm) | CRACKS | | | | | | |
|---|---|---|---|---|---|---|---|---|
| | | $Al_2O_3$ | $Si_3N_4$ | $Ta_2O_5$ | $SiO_2$ | AlN | BN | $ZrO_2$ |
| 601 | 30 | PRESENT | PRESENT | PRESENT | PRESENT | PRESENT | PRESENT | PRESENT |
| 602 | 60 | NONE | NONE | NONE | NONE | NONE | NONE | NONE |
| 603 | 80 | " | " | " | " | " | " | " |

Figure 6:
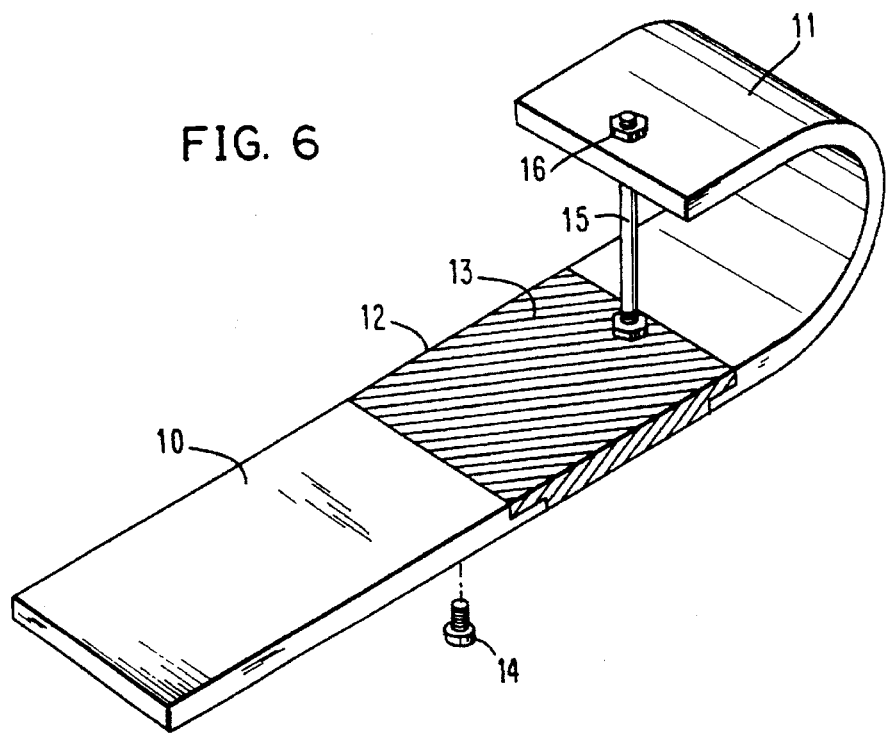
FIG. 6 is a perspective view showing a sample to be tested for hydrogen brittlement test in the second embodiment.

The dimension and shape of a sample is as follows. The low corrosion resistant member 10 was in the form of strip having a width of 10 mm and a length of 100 mm as shown in FIG. 6. On the other hand, the high corrosion resistant member 11 had a width of 10 mm and a length of 100 mm and was bent to the U-shape so that hydrogen corrosion effectively proceeds. The coupling members 12 having a width of 10 mm and lengths of 30 mm, 60 mm and 80 mm were provided. The low corrosion resistant member 10 was connected with the coupling member 12 by a bolt 14. The coupling member 12 was in series connected to the high corrosion resistant member 11 by an elongated bolt 15 which extended through a through-hole provided at the other end of the high corrosion resistant member 11. The separation between the opposite ends of the member 11 was reduced by fastening the member 11 was reduced by fastening a nut 16 to provide the sample with a constraint force. The coverage ratio of the coupling members 12 of any length was 90%. Since hydrogen was most absorbed at room temperature and the hydrogen brittlement occurring on the cathode (high corrosion resistant member) is sensitive. Test was conducted in two steps 1 and 2 as follows:

It is found from Table 15 that no cracks were formed and generation of hydrogen was suppressed in the side of the high corrosion resistant member 11 in the samples (Nos. 602 and 603) in which the length L of the insulating ceramic film of the coupling member 12 were 60 mm and 80 mm which are longer that 60 mm.

On the other hand, similar results were obtained in the samples of the experimental examples 2 to 6.

What is claimed is:

1. A galvanic corrosion resistant metal pipe having inner and outer surfaces and having a threaded portion at an end thereof and at least one stress relaxation layer of a metal on one of the inner surface, the outer surface or the inner and outer surfaces of said pipe, said at least one stress relaxation layer extending over at least 60 mm from said end of the pipe excluding the threaded portion;

said at least one stress relaxation layer having an insulating ceramic film coated thereon, said ceramic film having a thickness of 0.4 μm or more and a specific resistivity of $10^8 \Omega$ cm or more at a coverage ratio of 90% or more to less than 100%.

2. A galvanic corrosion resistant metal pipe according to claim 1, wherein the metal of the at least one stress relaxation layer is selected from the group consisting of Cr, Ti, Ta, Zr, Si, Fe, Nb and W.

3. Piping comprising a galvanic corrosion resistant joint of two different metal pipes, said pipes having inner and outer surfaces at least one of said different metal pipes having a threaded portion at an end thereof and at least one stress relaxation layer formed from one of a metal, a metal oxide, a metal nitride or a metal carbide formed on one of the inner surface, the outer surface or the inner and outer surfaces of said at least one pipe, said at least one stress relaxation layer extending over at least 60 mm from said end of the pipe excluding the threaded portion;

said at least one stress relaxation layer having an insulating ceramic film coated thereon, said ceramic film having a thickness of 0.4 μm or more and a specific resistivity of $10^8 \Omega$ cm or more at a coverage ratio of 90% or more to less than 100%.

4. Piping as defined in claim 3 in which one pipe is made from one of a stainless steel or Ni based alloy including 13% by weight or more of Cr and 20% by weight or more of Ni, and said at least one stress relaxation layer includes one of a single or composite layer made from one of Cr, Cr oxide, Cr nitride, Cr carbide, Ni or Ni oxide.

5. Piping as defined in claim 3 in which one pipe is made from one of a stainless steel including 13% by weight or more of Cr and 20% by weight or more of Ni, and said at least one stress relaxation layer includes one of a single or composite layer made from one of Cr, Cr oxide, Cr nitride or Cr carbide.

6. Piping as defined in claim 3 in which one pipe is made of a Fe based alloy including less than 13% by weight of Cr, said at least one stress relaxation layer includes one of a single or composite layer made from one of Fe, Fe oxide, Fe nitride or Fe carbide.

7. Piping as defined in claim 3 which the insulating ceramic film is made of a material selected from the group consisting of $Al_2O_3$, $Si_3N_4$, $Ta_2O_5$, $SiO_2$, AlN, BN and $ZrO_2$.

8. Piping as defined in claim 3 in which the insulating ceramic film is formed by a method selected from the group consisting of ion plating, sputtering, plasma chemical vapor deposition (CVD), metal-organic chemical vapor deposition (MO-CVD), thermal chemical vapor deposition (CVE), spraying and diffusion treatment.

9. Piping as defined in claim 3 in which the at least one stress relaxation layer is made of one of a single or composite material which is selected from the group consisting of Cr, Ti, Ta, Zr, Si, Nb, W, $Cr_2O_3$, $TiO_2$, CrN, TiN, TaN, ZrN, SiN, NbN, $Cr_7C_3$, $Cr_{23}C_6$, $Cr_2C_2$, TiC, TaC, ZrC, SiC, NbC, WC, $Fr_4N$ and $Fe_2O_3$, and is single layered or multi-layered.

10. Piping as defined in claim 3 in which the at least one stress relaxation layer has a thickness of 0.05 to 5 μm.

11. Piping as defined in claim 3 in which the total thickness of the at least one stress relaxation layer and the insulating ceramic film is 100 μm or less.

12. Piping comprising a galvanic corrosion resistant joint of two different metal pipes, said pipes having inner and outer surfaces, at least one of said different metal pipes having a threaded portion at an end thereof and at least one stress relaxation layer formed from one of a metal, a metal oxide, a metal nitride or a metal carbide formed on one of the inner surface, the outer surface or the inner and outer surfaces the exposed outer and/or inner surfaces of said at least one pipe, said at least one stress relaxation layer extending over at least 60 mm from said end of the pipe excluding the threaded portion and extending on exposed surfaces forming a space in said joint when said pipes are connected;

said at least one stress relaxation layer having an insulating ceramic film coated thereon, said ceramic film having a thickness of 0.4 μm or more and a specific resistivity of $10^8 \Omega$ cm or more at a coverage ratio of 90% or more to less than 100%.

13. A galvanic corrosion resistant metal pipe having inner and outer surfaces and having a threaded portion at an end thereof and at least one stress relaxation layer formed from a metal, a metal oxide, a metal nitride or a metal carbide formed on one of the inner surface, the outer surface or the inner and outer surfaces of said pipe, said at least one stress relaxation layer extending over at least 60 mm from said end of the pipe excluding the threaded portion;

said at least one stress relaxation layer having an insulating ceramic film coated thereon, said ceramic film having a thickness of 0.4 μm or more and a specific resistivity of $10^8 \Omega$ cm or more at a coverage ratio of 90% or more to less than 100%, wherein said at least one stress relaxation layer has a thermal expansion coefficient which is intermediate between those of the insulating ceramic film and the metal pipe.

14. A galvanic corrosion resistant metal pipe having inner and outer surfaces and having a threaded portion at an end thereof and at least one stress relaxation layer formed from one of a metal, a metal oxide, a metal nitride or a metal carbide formed on one of the inner surface, the outer surface or the inner and outer surfaces of said pipe, said at least one stress relaxation layer extending over at least 60 mm from said end of the pipe excluding the threaded portion;

said at least one stress relaxation layer having an insulating ceramic film coated thereon, said ceramic film having a thickness of 0.4 μm or more and a specific resistivity of $10^8 \Omega$ cm or more at a coverage ratio of 90% or more to less than 100%, wherein said insulating ceramic film is made of an amorphous layer except for a surface portion made of a crystalline layer.

15. A galvanic corrosion resistant metal pipe having inner and outer surfaces and having a threaded portion at an end thereof and at least one stress relaxation layer formed from one of a metal, a metal oxide, a metal nitride or a metal carbide formed on one of the inner surface, the outer surface or the inner and outer surfaces of said pipe, said at least one stress relaxation layer extending over at least 60 mm from said end of the pipe excluding the threaded portion;

said at least one stress relaxation layer having an insulating ceramic film coated thereon, said ceramic film having a thickness of 0.4μm or more and a specific resistivity of $10^8 \Omega$ cm or more at a coverage ratio of 90% or more to less than 100%, wherein a diffusion layer is formed between said at least one stress relaxation layer and the metal pipe by the diffusion of ions of a constituent metal of the at least one stress relaxation layer into the pipe.

16. A galvanic corrosion resistant metal pipe having inner and outer surfaces and having a threaded portion at an end thereof and at least one stress relaxation layer formed from one of a metal, a metal oxide, a metal nitride or a metal carbide formed on one of the inner surface, the outer surface or the inner and outer surfaces of said pipe, said at least one stress relaxation layer extending over at least 60 mm from said end of the pipe excluding the threaded portion;

said at least one stress relaxation layer having an insulating ceramic film coated thereon, said ceramic film having a thickness of 0.4 μm or more and a specific resistivity of $10^8 \Omega$ cm or more at a coverage ratio of 90% or more to less than 100%, wherein a diffusion layer is formed between the insulating ceramic film and the at least one stress relaxation layer by the diffusion of ions of a constituent metal of insulating ceramic film into the at least one stress relaxation layer.

17. A galvanic corrosion resistant metal pipe having inner and outer surfaces and having a threaded portion at an end thereof and at least one stress relaxation layer formed from one of a metal, a metal oxide, a metal nitride or a metal carbide formed on one of the inner surface, the outer surface or the inner and outer surfaces of said pipe, said at least one stress relaxation layer extending over at least 60 mm from said end of the pipe excluding the threaded portion;

said at least one stress relaxation layer having an insulating ceramic film coated thereon, said ceramic film having a thickness of 0.4 μm or more and a specific resistivity of $10^8 \Omega$ cm or more at a coverage ratio of 90% or more to less than 100%, wherein the insulating ceramic film is coated with a synthetic protecting resin layer on the outer surface thereof for protecting the film.

18. A galvanic corrosion resistant metal pipe having inner and outer surfaces and having a threaded portion at an end thereof and at least one stress relaxation layer formed from one of a metal, a metal oxide, a metal nitride or a metal carbide formed on one of the inner surface, the outer surface or the inner and outer surfaces of said pipe, said at least one stress relaxation layer extending over at least 60 mm from said end of the pipe excluding the threaded portion;

said at least one stress relaxation layer having an insulating ceramic film coated thereon, said ceramic film having a thickness of 0.4 μm or more and a specific resistivity of $10_8 \Omega$ cm or more at a coverage ratio of 90% or more to less than 100%, wherein the protecting synthetic resin is made from one of a fluorine resin or polyethylene.

* * * * *